(12) United States Patent
Hirshberg

(10) Patent No.: US 6,597,345 B2
(45) Date of Patent: Jul. 22, 2003

(54) MULTIFUNCTIONAL KEYPAD ON TOUCH SCREEN

(75) Inventor: David Hirshberg, Haifa (IL)

(73) Assignee: Jetway Technologies Ltd., Netanya (IS)

( * ) Notice: Subject to any disclaimer, the term of this patent is extended or adjusted under 35 U.S.C. 154(b) by 79 days.

(21) Appl. No.: 09/985,596

(22) Filed: Nov. 5, 2001

(65) Prior Publication Data

US 2002/0027549 A1 Mar. 7, 2002

Related U.S. Application Data

(63) Continuation-in-part of application No. PCT/US01/04706, filed on Feb. 13, 2001, which is a continuation of application No. 09/518,634, filed on Mar. 3, 2000, now abandoned.

(51) Int. Cl.$^7$ .................................................. G09G 5/00
(52) U.S. Cl. ...................... 345/168; 345/173; 345/169; 341/22
(58) Field of Search ................................ 345/173, 168, 345/169; 341/22, 23, 20

(56) References Cited

U.S. PATENT DOCUMENTS

| | | | | |
|---|---|---|---|---|
| 4,680,577 A | * | 7/1987 | Straayer et al. | 345/160 |
| 5,861,823 A | * | 1/1999 | Strauch et al. | 341/22 |
| 5,966,671 A | * | 10/1999 | Mitchell et al. | 455/575 |
| 6,520,699 B2 | * | 2/2003 | Abe | 400/485 |
| 6,525,278 B2 | * | 2/2003 | Villain et al. | 200/5 R |

* cited by examiner

Primary Examiner—Kent Chang
(74) Attorney, Agent, or Firm—Mark M. Friedman

(57) ABSTRACT

A multifunction keypad includes a touch-sensitive surface with a number of regions designated as keys. A processor, associated with the touch-sensitive surface, is configured to: (i) identify a contact location at which an object comes into contact with the touch-sensitive surface, (ii) determine a selected one of the keys corresponding to the one of the regions within which the contact location is located, (iii) identify a direction of motion of the object across the touch-sensitive surface relative to the contact location, and (iv) select in a manner conditional upon at least the direction of motion one of a plurality of functions associated with the selected key.

31 Claims, 12 Drawing Sheets

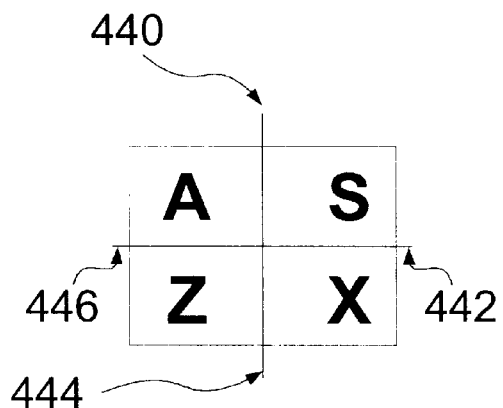
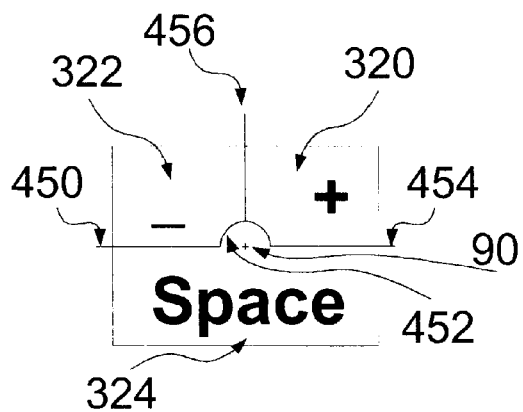
Figure 8a
Figure 8b
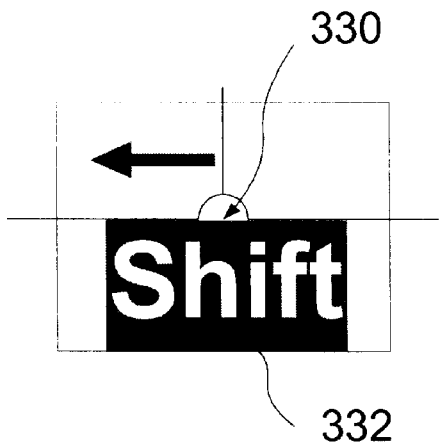
Figure 8c

MULTIFUNCTIONAL KEYPAD ON TOUCH SCREEN

This is a continuation-in-part of application no. PCT/US01/04706 filed Feb. 13, 2001, which is a continuation of application Ser. No. 09/518,634 filed Mar. 3, 2000, now abandoned.

FIELD AND BACKGROUND OF THE INVENTION

The present invention relates to data input devices and, in particular, it concerns a multifunctional keypad implemented on a touch screen.

Alphanumeric data entry methods for compact electronic devices pose various problems. Mechanical keypads are one of the most popular methods, but they suffer from large space consumption that in many cases is not practical in compact mobile environments. One solution to the compactness problem is to use a mechanical multifunctional keypad. Several such solutions have been suggested, for example:

U.S. Pat. No. 4,029,915—S. Ojima, "Miniaturized calculator keyboard switch assembly having universally pivoted key actuators"

U.S. Pat. No. 5,852,414 S. H. Yu, D. H. Yu "4-way triangle shaped alphanumeric keypad"

U.S. Pat. No. 5,528,235—E. Lin & W. Lin "multi-status multi-function data processing key & key array"

U.S. Pat. No. 5,861,823 G. J. Strauch & P. Samola, Data entry device having multifunction keys.

Another group of solutions that has gained popularity lately in PDA device is the use of a touch screen. Entering alphanumeric text using a touch screen is done either by hand writing recognition or using small keypads referred to in some literature as a "soft keypad".

The data entry, in both cases, is done with the aid of stylus since the tip of the finger cannot give the required accuracy.

Hand writing recognition suffers from high rate of errors that reduce drastically the speed of typing and the convenience of operation. A soft keypad on a PDA screen of typical size suffers from a very small footprint for each key, which requires considerable user concentration and hence degrades the speed and comfort of use. In both cases, the user needs to employ a stylus for data entry. This is inconvenient, particularly in cases where frequent entry of short memos or the like, where the stylus must be retrieved frequently from its storage position.

There is therefore a need for a compact multifunction keypad which would not require great precision of use and which could be conveniently and effectively operated by use of the finger.

SUMMARY OF THE INVENTION

The present invention is a multifunctional keypad implemented using a touch screen, and a corresponding method for operating a keypad.

According to the teachings of the present invention there is provided, a multifunction keypad comprising: (a) a touch-sensitive surface having defined thereon a plurality of regions designated as keys; and (b) a processor associated with the touch-sensitive surface and configured to: (i) identify a contact location at which an object comes into contact with the touch-sensitive surface, (ii) determine a selected one of the keys corresponding to the one of the regions within which the contact location is located, (iii) identify a direction of motion of the object across the touch-sensitive surface relative to the contact location, and (iv) select in a manner conditional upon at least the direction of motion one of a plurality of functions associated with the selected key.

According to a further feature of the present invention, the touch-sensitive surface is a touch-sensitive display screen.

According to a further feature of the present invention, the processor is configured to select a first of the plurality of functions if the direction of motion falls within a first range of angles and a second of the plurality of functions if the direction of motion falls within a second range of angles non-overlapping with the first range of angles.

According to a further feature of the present invention, the processor is configured not to select any of the plurality of functions if the direction of motion falls within a third range of angles interposed between the first range of angles and the second range of angles.

According to a further feature of the present invention, the first range of angles is greater than the second range of angles.

According to a further feature of the present invention, the processor is further configured to determine a length of motion of the object across the touch-sensitive surface relative to the contact location.

According to a further feature of the present invention, the processor is configured to select a first of the plurality of functions if the length of motion falls within a first range of lengths in a given direction and a second of the plurality of functions if the length of motion falls within a second range of lengths in the given direction.

According to a further feature of the present invention, the processor identifies a length of motion below a given value as a touch-and-release condition.

According to a further feature of the present invention, the processor is configured not to select any of the plurality of functions on occurrence of a touch-and-release condition.

According to a further feature of the present invention, the processor is configured to select a first of the plurality of functions if the direction of motion falls within a first range of angles, and wherein the processor is configured to select the first function additionally on occurrence of a touch-and-release condition.

According to a further feature of the present invention, one of the plurality of functions is selected by the processor exclusively on occurrence of a touch-and-release condition.

According to a further feature of the present invention, a plurality of the keys provide at least four direct functions per key.

According to a further feature of the present invention, a majority of the keys provide exactly four direct functions per key.

According to a further feature of the present invention, the processor is selectively operable in a single-function mode wherein the processor selects a single function on contact with a given one of the keys independent of the direction of motion.

There is also provided according to the teachings of the present invention, a method for designating functions on a multifunction keypad defined by a plurality of regions on a touch-sensitive surface, each region being designated as a key, the method comprising: (a) identifying a contact location at which an object comes into contact with the touch-sensitive surface, (b) determining a selected key corresponding to the region within which the contact location is located, (c) identifying a direction of motion of the object across the touch-sensitive surface relative to the contact location, and (d) selecting in a manner conditional upon at least the direction of motion one of a plurality of functions associated with the selected key.

There is also provided according to the teachings of the present invention, a keypad comprising a twelve-key telephone-type alphanumeric keypad, wherein each key is a multifunction key configured for single-contact selection of one of four functions, and wherein each key corresponding to a digit in the range 2–9 is associated with three letters, and wherein the letter "s" is associate with a key corresponding to "*" and the letter "z" is associated with a key corresponding to "#".

According to a further feature of the present invention, the letters "s" and "z" are selected by contact with the key corresponding to "*" and "#", respectively, in conjunction with a generally upward movement.

According to a further feature of the present invention, the plurality of keys further includes a row of keys associated with at least the functions ENTER, SPACE and DELETE.

There is also provided according to the teachings of the present invention, a multifunction keypad comprising: (a) a touch-sensitive surface having defined thereon a plurality of regions designated as keys; and (b) a processor associated with the touch-sensitive surface and configured to: (i) identify a contact location at which an object comes into contact with the touch-sensitive surface, (ii) determine a selected one of the keys corresponding to the one of the regions within which the contact location is located, (iii) identify a path of motion of the object across the touch-sensitive surface relative to the contact location, and (iv) select, in a manner conditional upon at least one parameter of the path of motion, one of a plurality of functions associated with the selected key.

BRIEF DESCRIPTION OF THE DRAWINGS

The invention is herein described, by way of example only, with reference to the accompanying drawings, wherein:

FIGS. 8A, 8B and 8C are schematic enlarged views of selected keys from the keypad of FIG. 6 illustrating various preferred zone configurations;

DESCRIPTION OF THE PREFERRED EMBODIMENTS

Figure 1:
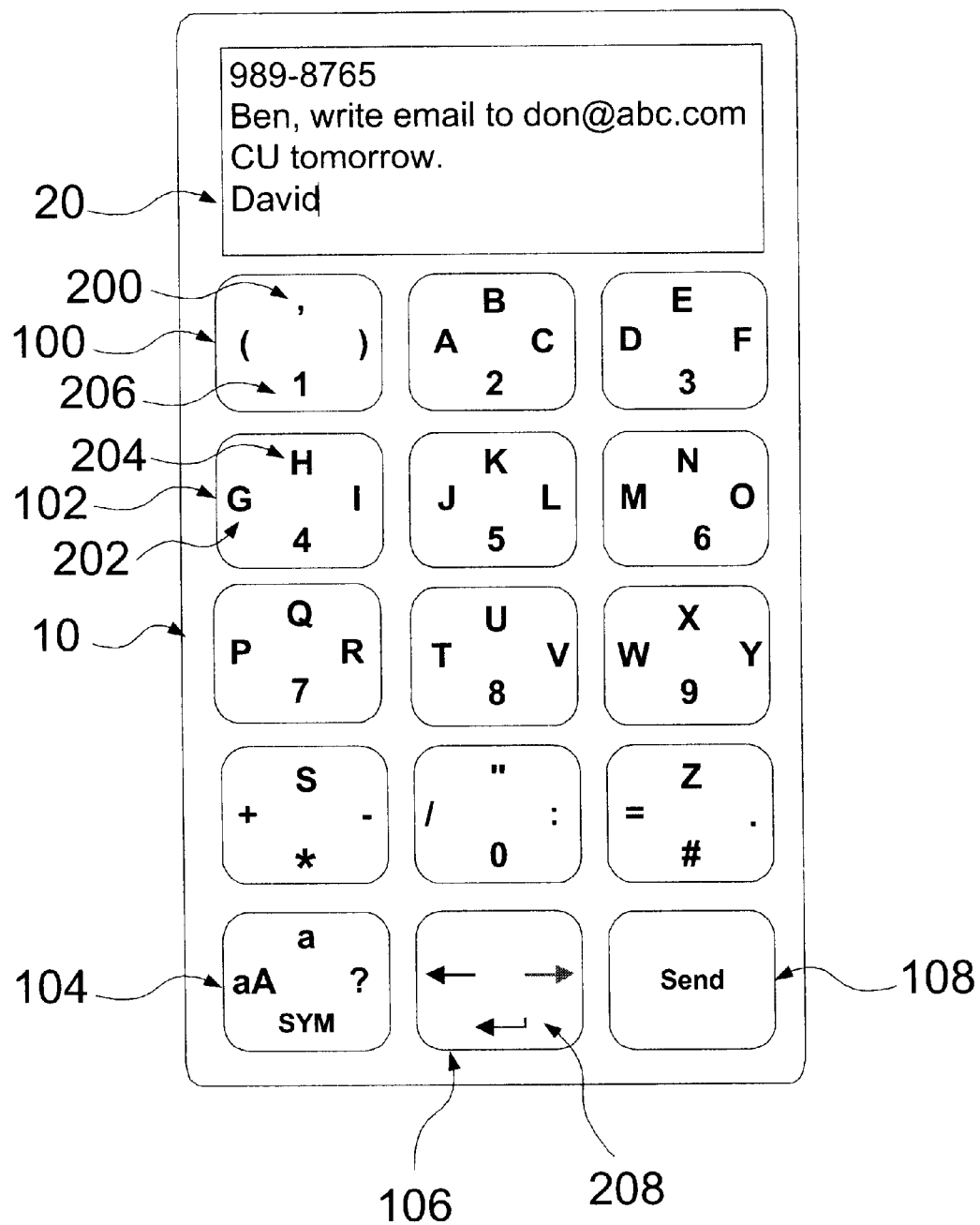
FIG. 1 is a schematic plan view of a first preferred implementation of a multifunction keypad, constructed and operative according to the teachings of the present invention.

The present invention is a multifunctional keypad implemented using a touch screen, and a corresponding method for operating a keypad.

The principles and operation of multifunctional keypads according to the present invention may be better understood with reference to the drawings and the accompanying description.

Referring now to the drawings, FIGS. 1–13 illustrate various preferred implementations of a multifunction keypad, constructed and operative according to the teachings of the present invention. Generally speaking, the multifunction keypad includes a touch-sensitive surface 10 upon which are defined a plurality of regions designated as keys. Associated with surface 10 is a processor 12 (seen in FIGS. 13A and 13B). Processor 12 is configured to: (i) identify a contact location at which an object comes into contact with the touch-sensitive surface, (ii) determine a selected one of the keys corresponding to the one of the regions within which the contact location is located, (iii) identify a path of motion of the object across the touch-sensitive surface relative to the contact location, and (iv) select, in a manner conditional upon at least one parameter of the path of motion one of a plurality of functions associated with the selected key. Most preferably, the primary parameter used in the selection of the function is the direction of motion of the path.

It will be immediately apparent that the present invention provides profound advantages over the aforementioned data input devices. Specifically, by providing multifunction keys, the number of keys is reduced, and hence the area of each key can be increased. This permits finger operation of the keys. At the same time, the selection of function by detecting direction of motion subsequent to initial contact renders function selection quick and intuitive. Since the motion is evaluated relative to the location of initial contact, the location of initial contact within the key is unimportant. This reduces the precision of actuation required from the user to a level that finger-tip operation is reliable. This and other advantages of the present invention will become clearer from the following description.

As mentioned above, for basic alphanumeric data entry operation one typically requires 40 to 60 keys to be activated instantaneously. In typical touch screen used in mobile devices such a numbers of keys necessarily lead to very small key size that can not be activated accurately by tip of finger and even when using a stylus it takes considerable attention to direct the touch to the right place.

In the current invention 4–6 characters are typically grouped with one key. The number of keys on the screen may thus be reduced to 10–16 keys, where each key size is in the range of a tip of a finger size. Such size is well suitable for comfort key visual selection as well as finger operation. The current invention combines the advantageous features of a soft key keypad (e.g., its relative small typing error probability, dynamic layout and labeling) with the rich functionality gained by the ability of the touch screen to detect many types of activation motion on the key.

The preferred embodiments are suitable to be operated interchangeably by use of a stylus or directly by the user's finger, as preferred by the user.

Figure 4:
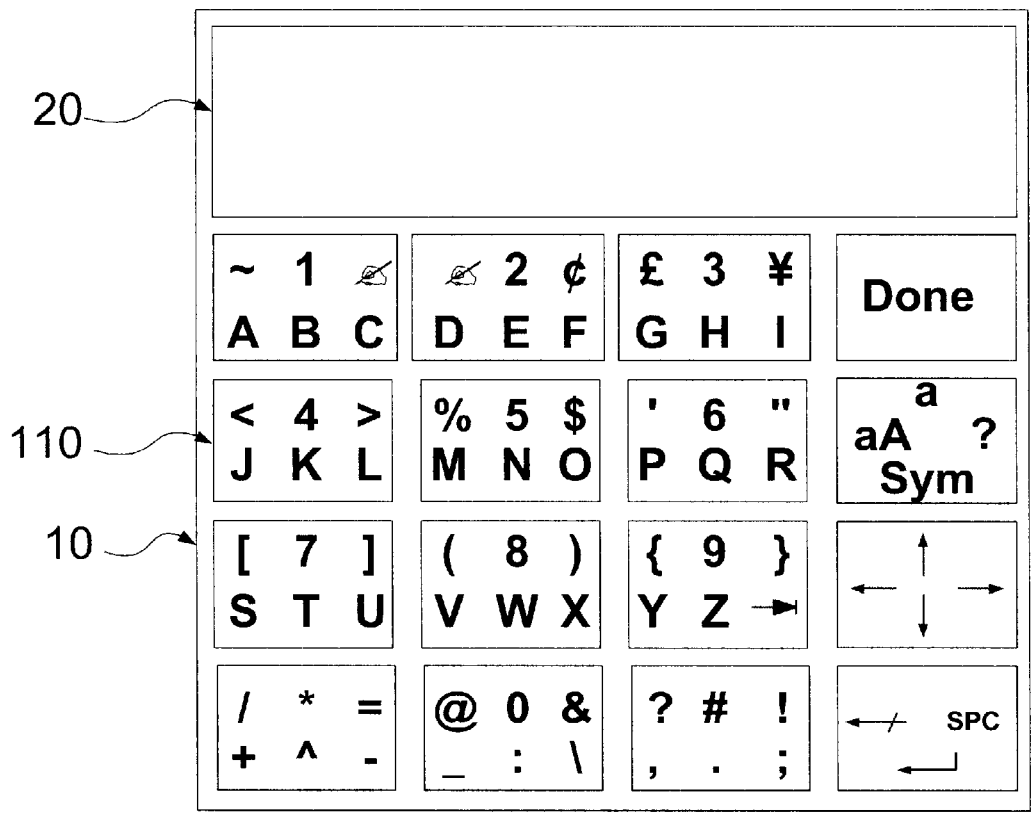
FIG. 4 is a schematic plan view of a second preferred implementation of a multifunction keypad, constructed and operative according to the teachings of the present invention.
Figure 6:
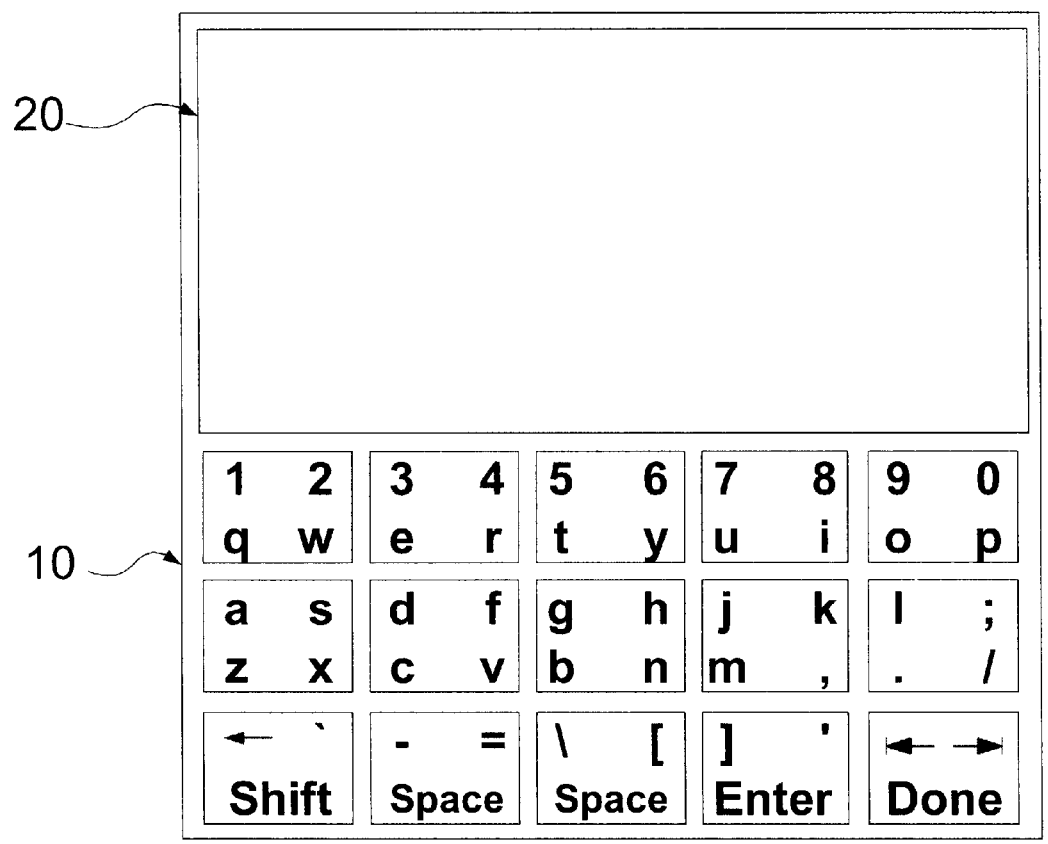
FIG. 6 is a schematic plan view of a third preferred implementation of a multifunction keypad, constructed and operative according to the teachings of the present invention.
Figure 9:
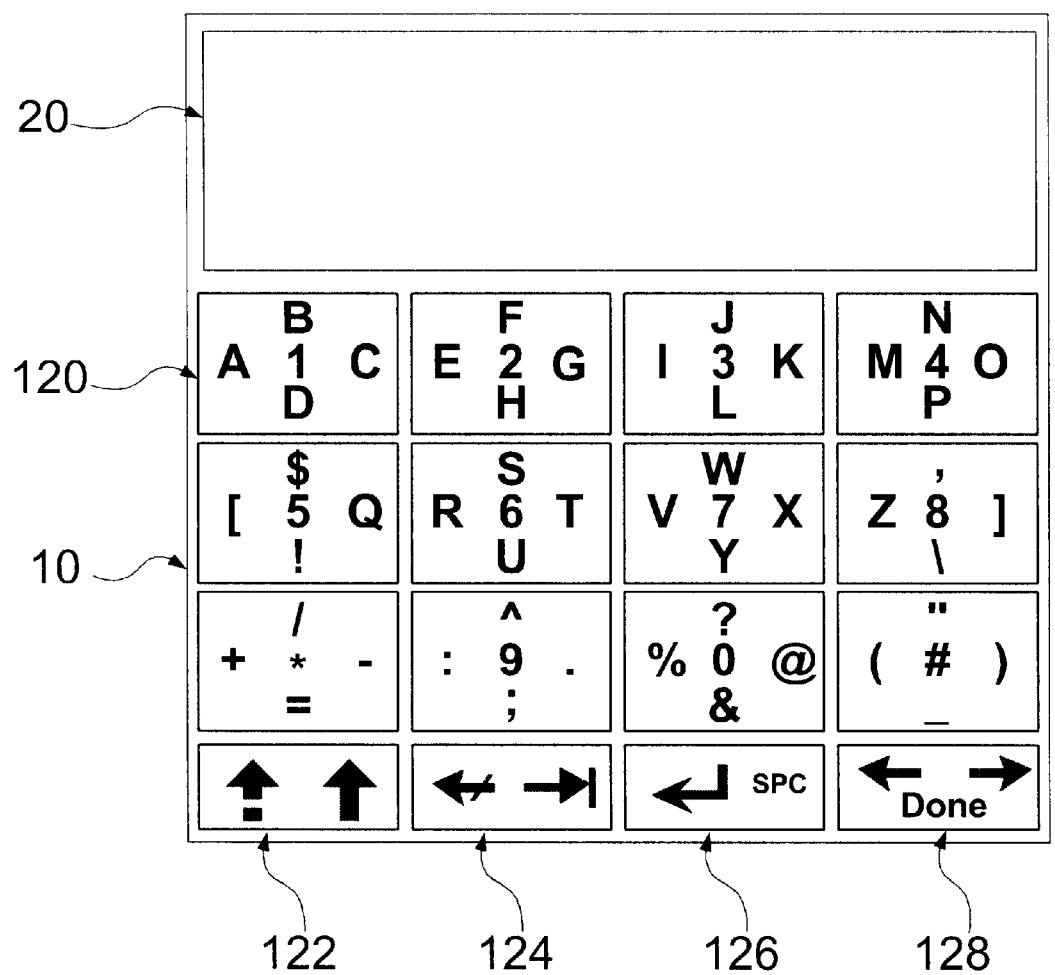
FIG. 9 is a schematic plan view of a fourth preferred implementation of a multifunction keypad, constructed and operative according to the teachings of the present invention.
Figure 10A:
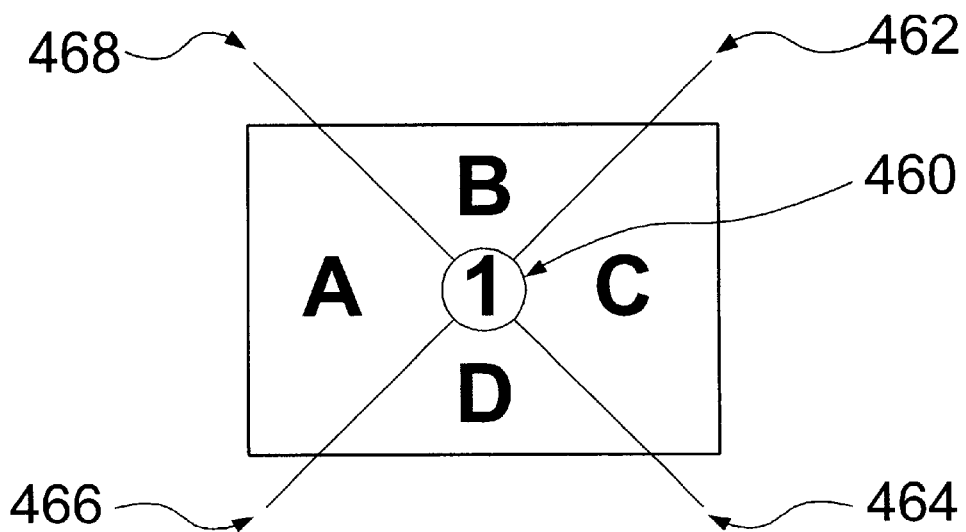
FIGS. 10A, 10B and 10C are schematic enlarged views of selected keys from the keypad of FIG. 9 illustrating various preferred zone configurations.
Figure 10B:
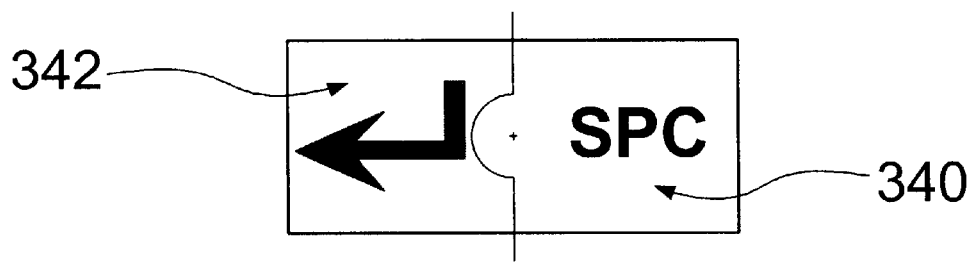
Figure 10C:
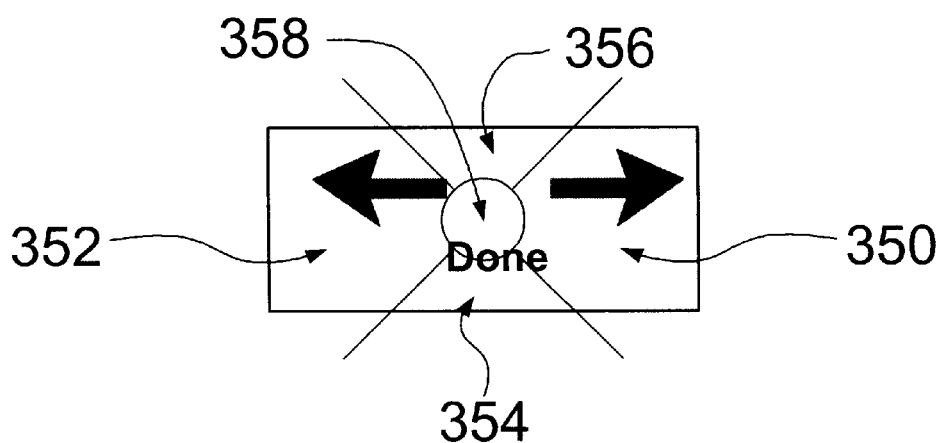

Referring now specifically to FIG. 1. A touch screen 10 with width of approximately 3–4 cm and height of approximately 6–8 cm is shown. Typically such screen size is implemented on cellular phones device, like for example the Samsung I-MAX. The touch screen dimensions lead us to pick a 3×5 key matrix layout for the multi functional keypad. The number of keys and their shape can vary in different implementations. For example, in other preferred embodiments for PDA devices, like the Palm Pilot®, the typical size of square 6×6 cm is used and different layouts are appropriate in this case. In FIGS. 4, 6 and 9, three possible embodiments for square 6×6 cm touch screen are shown.

Referring back to FIG. 1, the touch screen 10 which is divided to two zones: the display zone 20 contains the result of the text entry and the soft keys zones contains 3×5 keys keypad. In the preferred case illustrated here, the keypad includes thirteen 4-way soft keys (e.g. keys 100, 102 and 104), one 3-way soft key 106 and one regular one function soft key 108. The 4-way key function/characters activation is done by touching the key anywhere on the key area and then tilting or moving the finger to one off the following directions: up, down, left and right. In stylus operation, since the tip of the stylus is very narrow only move operations can be used. The character/function associated with each direction is preferably marked by a label on the key according to the direction. For example, the label 200 representing a comma text entry is associated with the move/tilt upwards when touching the key 100, and the label 202 representing the letter 'G' is activated by touching the key 102 and move or tilt the finger or stylus towards the left. The label can be a character as in 204, a number as in 46, other text like symbols like the comma in 200, any other graphic icon like the ENTER graphic symbol in 208 or a text abbreviation like the 'Send' label 210 in key 108.

The activation of the key start by the act of touching in any point in the area on the key. The key contains labels (one or more) to imply the functions associated with the key. The associated function can be entering characters to the display 20 or applying a command function like the send operation in key 108. The keys in the keypad can be a mix of regular one-function keys like key 108 with other multi function keys. In the case of one function a regular touch operation activate the function. In multi-function key the first touch on the key activate the key and the relative trace created by the movement or the tilt on the touch with respect to the initial touch point is selecting the appropriate function among the functions that associated with the selected key. In order to use the touch screen as a keypad a keypad controller entity should be exist on the device. This controller can read the coordinate of the touch operation on the touch screen and communicate with the device to transfer the selected character/function that have been selected. The keypad can be implemented by explicit dedicated hardware, or by firmware or software running on a processor. All such implementations are referred to generically in the description and claims as a processor configured to perform the recited functions.

Figure 2A:
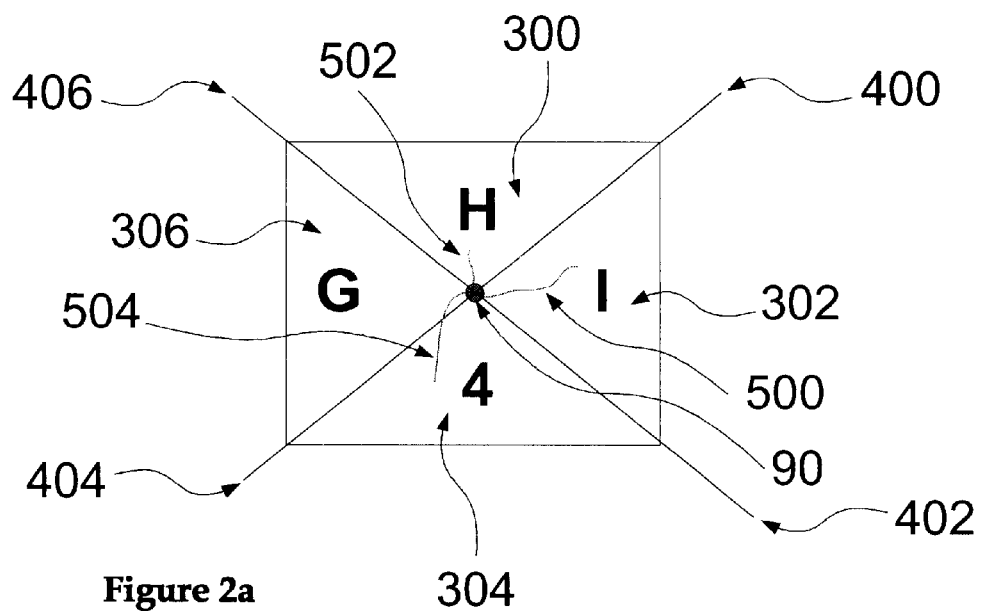
FIGS. 2A and 2B are schematic enlarged views of a first key from the keypad of FIG. 1 illustrating the principles of operation of the present invention with two different locations of initial contact with the key.

In order to select the function activated by the user, the keypad controller calculates several zones when a touch on a key is detected. The zones created for the 4-way function key 102 in two situation of the place of the initial contact points on the key are shown in the FIG. 2a and FIG. 2b. In FIG. 2a the initial contact point 90 is in the center of the key and the four zones 300, 302, 304, 306 are sectors created by four rays 400, 402, 404, 406 emerging from the initial contact point 90. Typically in symmetrical 4-way multi-function key, each sector span will be 90 degree, but one may change it to enlarge or reduce the activation probability of some of the functions.

The zone 300, which is associated with the letter 'H', is the area between rays 400 and 406. Zone 302 associated with the letter 'I' is the area between rays 400 and 402. Zone 304 associated with the number '4' is the area between rays 402 and 404. Zone 306 associated with the letter 'G' is the area between rays 404 and 406.

The path of the movement of the touch from the initial contact point on the touch screen until the removal of the finger or the stylus from the touch screen is referred to herein as the "trace". In FIG. 2a three traces 500, 502, 504 are shown. Trace 500 is completely in zone 302 hence the keypad controller select the character 'I' as the selected outcome. Trace 502 is completely in zone 300 so the selected function is 'H'. Trace 504 although in the beginning of the trace go through zone 306, most of the rest of the trace is in zone 304. In this case the keypad controller decision is preferably set to select the number '4'. In some implementation when a mistake should be absolutely avoided, such trace would not accepted by the keypad controller and error indication should be given to the user. To reduce unwanted errors it is also possible to create some forbidden zones as demonstrated in sequel for the 3-way function key in FIG. 3a.

Figure 2B:
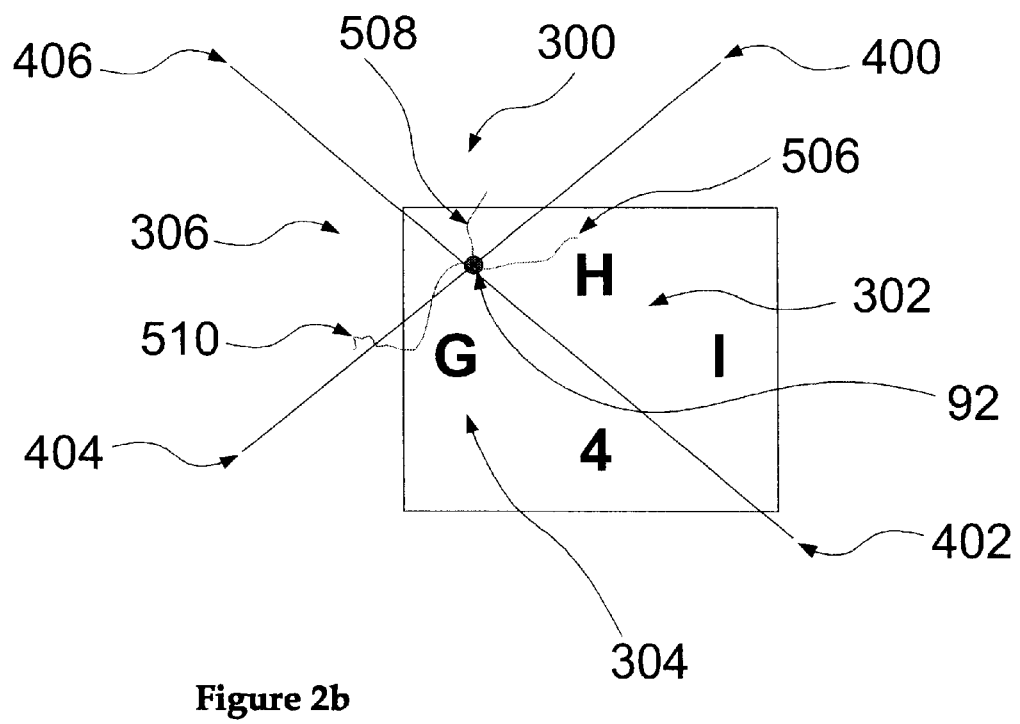

In FIG. 2b the initial contact point 92 is on the upper left side of the key. Even in such event the configuration of the zones kept the same as in FIG. 2a however the zones 300, 302, 304, 306 are shifted to the up and to the left according to the location of the initial contact point 92. Trace 506 in this example will indicate the letter 'I' although the trace is close to the label 'H'. Trace 508 will indicate the letter 'H'. The fact that the trace is leaving the border of the key is not relevant to the decision even when the trace go over adjacent keys as well. Trace 510 is going over zone 304 and 306 causing an ambiguity situation. In this case the keypad controller will not activate any function and optionally an error indication may be given to the user.

Figure 3A:
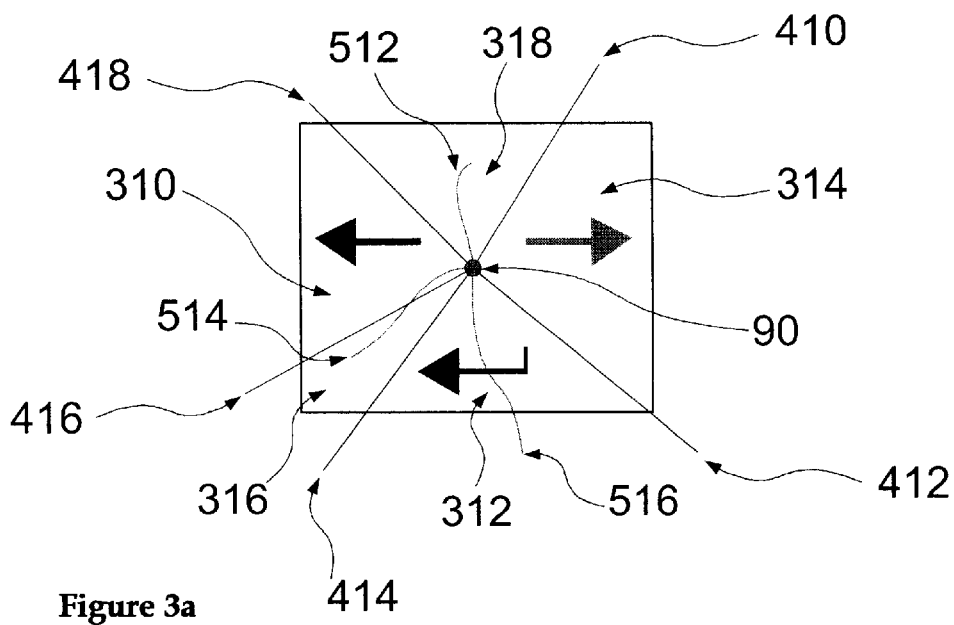
FIGS. 3A and 3B are schematic enlarged views of a second key from the keypad of FIG. 1 illustrating the use of variable ranges of zone angles and forbidden zones to render functions selectively easier or more difficult to select.

In FIG. 3a the implementation detail of key 106, a 3-way multi-function key is given. There are 5 zones defined by five rays 410, 412, 414, 416, 418 emerging from the initial contact point 90. Three zones assigned to the functions as follows: zone 310—delete character backward (known also as backspace), zone 312—ENTER and zone 314—SPACE.

Zone 316 defined between the rays 414 and 416 is in adjacent to the backspace zone is created as an forbidden zone in order to minimize the error event of activation a backspace function by mistake when trying to activate the ENTER function.

The upper zone 318 defined between the rays 410 and 418 is forbidden zone since no function is assigned to the upper side of the key. The fact that no function is assigned to the upper side of the key is used to slide ray 410 upwards and create larger zone for the space function. Since the use of space function is very frequent enlarging the space zone give the user more convenient activation of that function. Later on we will see another effective way to give a function activation advantage over the other function in the key. From the example of key 106 it is obvious that controlling the zones configuration can change some design goals of trading false activation with activation convenience.

Traces 512 reside completely on zone 318 which is a forbidden zone hence the keypad controller will not activate any function and error indication will be given to the user. Trace 514 will associate by the keypad controller to zone 316 which is also a forbidden hence the keypad controller will not activate any function and error indication will be given to the user as well.

Trace 516 reside on zone 312 hence ENTER function will be activated.

Figure 3B:
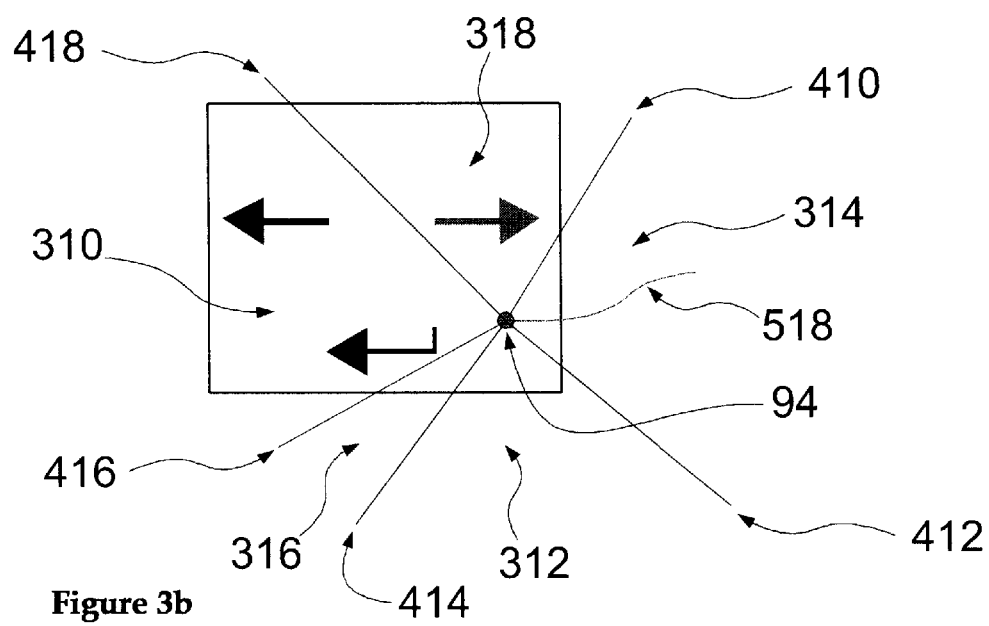

FIG. 3b show the same key 106 when the initial contact point 94 is in the lower left side of the key. As can be shown in the figure the rays 410, 412, 414, 416, 418 and zone 310, 312, 314, 316, 318 are shifted according to the initial contact point 94 but their constellation is not change. Trace 518 is associated to the function SPACE. In the rest of the document we will always show the initial contact point in the center of the key for sake of clarity and simplicity. It should be noted, however, that the initial contact point can be in any place over the key and the zones and zone boundaries are shifted in the touch screen according to actual initial contact point on the key, as illustrated above with reference to FIG. 2B.

Referring back to FIG. 1, key 104 is a 4-way soft key that have the following functions: The left one is shift operation which toggle between upper and lower case letter for the next key press duration. When activating this key the label on the key will be highlighted and the letters on all the other keys optionally change to lower case. After one letter activation the letters will change back to capitals and the highlighted label will go back to its normal state. If the upper function (Caps lock) is activated the label 'a' will change to A and the letter label will change to lower case until the user will switch back to upper case. The lower function, SYM, change the labels on the keypad to support entry of additional symbols like $, %, @, &, etc. The right operation on key 104 is dedicated to switch the keypad language. In the figure the label is the familiar symbol for indicating a change to Hebrew language. When this function is activated the letters will change to Hebrew letter according to Israeli standard 4514. The label will change to 'E' to indicate the back switch to English keypad. Other languages obviously can be supported as well. The functions on key 104 demonstrate the well-known strength of dynamic labeling used on soft keypad.

It will be noted in this context that, by use of the shift key, symbol key, language settings or other shift or toggle keys, each multifunction key may actually perform many different functions. Nevertheless, for the purpose of designating the number of functions which can be selected by a key, reference is made to "direct functions", namely, functions which can be selected directly from the key in its current state.

The basic alphanumeric data entry is based on the upper 3×4 4-way matrix. The lower function on this key matrix is the standard 12 key phone keypad while the other 3 function in each key is assigned to the Latin letter according to the standard phone letter to number association. According to the standard layout referred to herein as the "telephone-type alphanumeric keypad", the 26 letters of the alphabet are assigned to the numerals 2–9. Most of the keys thus have one numeral and three letters, totaling four functions. However since the '7' key and the '9' key are associated with four letter each, there is one letter in each of those keys that can not be allocated. In U.S. Pat. No. 5,528,235 the solution was to have 5-ways keys instead of 4-way keys. However, such solution tends to overload the keypad in additional functions that are not essential to basic data entry, produce additional complexity to the user and either enlarge the key size by a factor of approximately 1.5 or reduce the label size in the key by 1.5. All of these disadvantages are a high cost for the five-function demand which is relevant to only 2 out of 12 keys.

In a preferred implementation of the present invention, this complication is avoided by associating exactly three letters with each of the keys "2"-"9", and transferring the fourth letter of the "7" and "9" keys to the upward function of the key below. Thus, the letter "s" is activated by upward operation of the key corresponding to "*" and the letter "z" is activated by upward operation of the key corresponding to "#".

Parenthetically, it should be noted that this aspect of the present invention is not limited to touch sensitive implementations of a keypad. Specifically, the solution for rendering a "telephone-type alphanumeric keypad" using directional multifunction keys with no more than four direct functions per key is applicable to any keypad wherein each key is a multifunction key configured for single-contact selection of up to four functions. Thus, by way of one non-limiting example, this solution facilitate an implementation of the keypad of the aforementioned U.S. Pat. No. 5,528,235 with four-way keys instead of the five-way keys proposed therein.

It should be noted that the twelve-key telephone-type alphanumeric keypad referred to herein is not necessarily, or even typically, used alone. Thus, the aforementioned twelve keys may be supplemented by a number of additional keys for providing additional functions. In a particularly preferred implementation, the keypad further includes a row of keys associated with at least the functions ENTER, SPACE and DELETE.

It will be appreciated that the proposed key designations maintain the familiar overall layout with all four letters associated with the key '7' ('P', 'Q', 'R', 'S') surrounding the 7 label, and those associated with the "9" label disposed thereabout.

As implied by the text on the display zone 20 this embodiment gives a very good solution for a sending of an SMS over a touch screen equipped cellular phone. The user writes down very quickly the phone number and the desired alphanumeric message and the press send soft key to send it over.

According to a further optional feature of the present invention, the keyboard may be selectively operable in a single-function mode wherein a single function is selected on contact with a given key, independent of the direction of motion. This may be useful, for example, in a calculator mode or telephone dialing mode wherein only numbers are required.

The rest of this description describes another three preferred embodiments of multi functional keypads particularly suited to touch screen of devices using a square screen with size approximately 6 by 6 centimeter. Several additional options that can be used by a multi-function touch screen keypad are demonstrated. It will be understood that all features described in any one implementation are interchangeable between the various different implementations unless explicitly stated otherwise.

Referring now to FIG. 3, a preferred embodiment for Palm pilot touch screen is shown. The soft keypad contains 16 keys in a 4×4 matrix form. The left 12 keys are 6-way soft keys, while the upper left key is standard one function soft key, the two middle left are 4-way keys structure shown before and the lower left key is the same as key 106 shown in FIG. 1.

Figure 5:
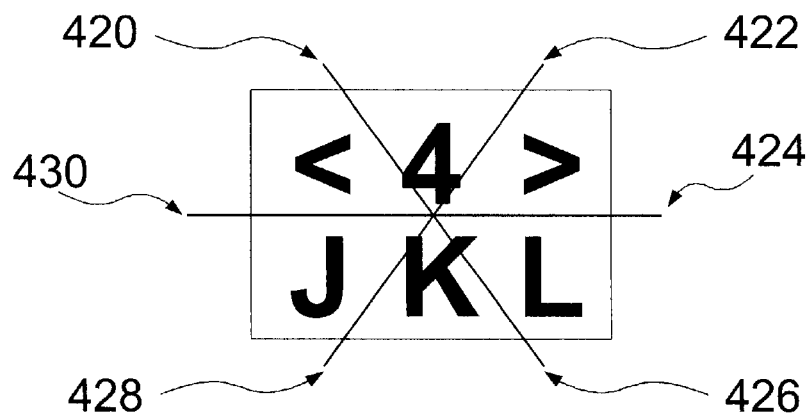
FIG. 5 is a schematic enlarged view of a key from the keypad of FIG. 4 illustrating typical zone angles for a six-function key.

Key 110 is one of the twelve 6-way keys. The upper middle label corresponding to a move/tilt operation of the twelve keys are assigned to the 12 symbols of the telephone keypad while the lower line of labels assigned to left-down, down and right-down movement/tilt operation occupied with the Latin letters in alpha-bet order. The decision zones for an initial contact point in the center of the key are shown in FIG. 5. Six rays 420–430 create the decision zones with 60 degrees difference between adjacent rays.

Figure 7:
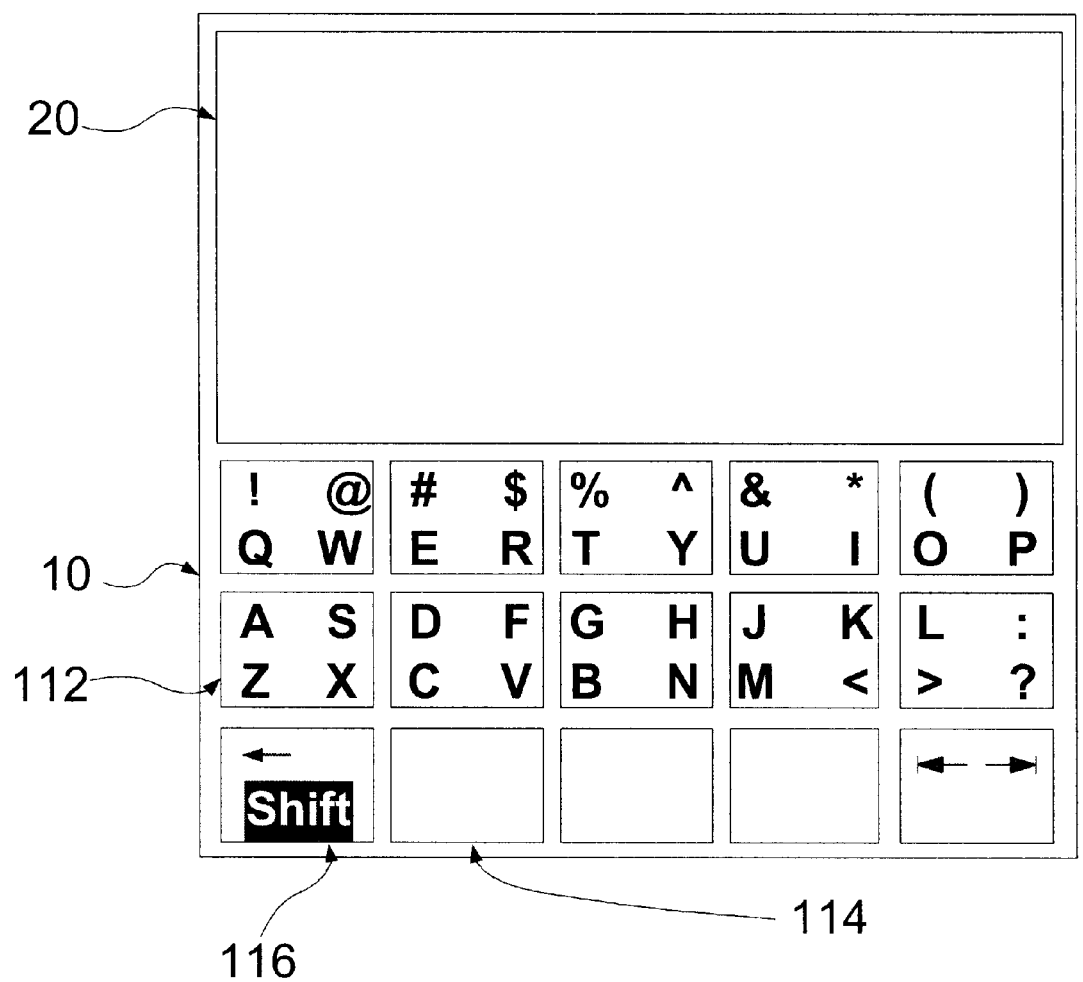
FIG. 7 is a schematic plan view of the keypad of FIG. 6 in a Shift-Lock state.

FIG. 6 show different layout based on QWERTY keyboard and 4-way multi-function keys. This keypad is more compact then the one in FIG. 5, however most of the non-letters text symbols are activated using a shift operation. The layout of the "shifted" keypad is shown in FIG. 7. The shifted keypad keep the layout of the shift operation of the QWERTY keyboard. In FIG. 8a we see the details of the decision zones for key 112, which is one of the 4-way keys in the keypad. The four rays 440, 442, 444, 446, create the decision zones. The activation operation in this key is by moving/tilting the finger toward upper-right, upper-left, lower-rights and lower-left direction instead of up, down, left and right in the keypad shown in FIG. 1. The bottom line of keys in the keypad has several unique keys for example key 114 is a 3-way key. The decision zones of key 114 are shown in FIG. 8b. Referring momentarily back to FIG. 8a, when the trace on the key contains only one point (from trace definition this point can be only the initial contact point and the user operation is actually a simple press on the key, referred to as a touch-and-release operation) since the initial contact point is on the boundary between all four zones the keypad controller will not activated any of the letters and error indication will be given to the user. Refer back to FIG. 8b, since SPACE is frequently used, we would like to activate the SPACE even with just a touch-and-release operation on key 114. In order to do that the zone of SPACE 324 should contains the initial contact point inside the zone. The small arc 452 is generated to support this feature so the boundary of the space zone is constructed from line 450, 454 and the arc 452. Any move/tilt down after the initial contact with the key will still produce a SPACE, however move tilt upwards will produce the '_' or '+' sign depended on the direction. The minimal length of line needed to activate the '_' or '+' equal to the length of the radius of the arc. All keys in the bottom line of the keypad have the lower function activation option with a simple press. Key 116, the shift key has in addition another zone 330 as shown in FIG. 8c. This zone is associated to a simple press operation on key 116. In such case the shift operation is in action only for one consecutive press on the keypad. When the user move the finger downward when pressing key 116 (the trace is associate with zone 332) the shift operation is act like 'CAPS Lock' and the shift operation stay in action until another press on the shift key is done by the user.

FIG. 9 show yet another possible embodiment with 5-way keys keypad. An example of the decision zones of one of the 5-way key, key 120, is given in FIG. 10a. The center function (the number '1') is activated by a simple press on the key while the other keys are activated using press and move/tilt operation. The '1' zone is a small circle 460 around the initial contact point while the other four zones are constructed by four rays 462, 464, 466, 468. The bottom line contains three 2-way keys 122, 124, 126. The zone constellation of that key is demonstrated over key 126 in FIG. 10b. Key 126 contains two function the right one is the SPACE and the left one is the ENTER. Since SPACE is more frequent then ENTER we would like to activate space with simple press hence the space zone 340 contain a small cycle around the initial contact point.

Key 128 is a 3-way key with two cursor movement command (forward and backwards) and the done command that close the keypad and return to the calling application. Since we want to give the user the sense of direction in the cursor movement functions the zones of those function 350, 352 are restricted to sectors with direction towards the cursor movement direction. The 'Done' key terminate the keypad operation hence we do not what to get out on a simple press so Done zone 354 do not contains the central circle zone 358. This zone is a forbidden zone hence simple press will not activate any of the function and error indication will be given to the user. Zone 356 is also forbidden zone since no function is associated with it.

Figure 11A:
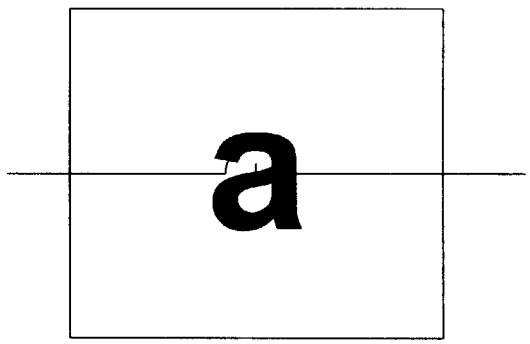
FIGS. 11A, 11B and 11C are schematic enlarged views of alternative key configurations for use in multifunction keypads constructed and operative according to the teachings of the present invention.
Figure 11B:
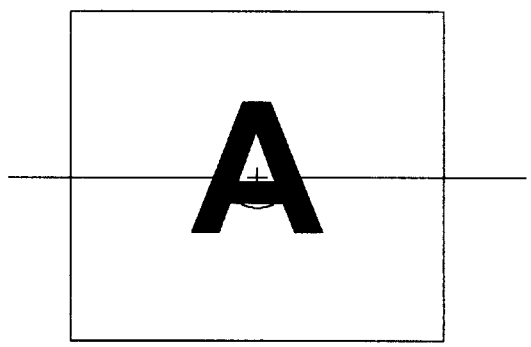
Figure 11C:
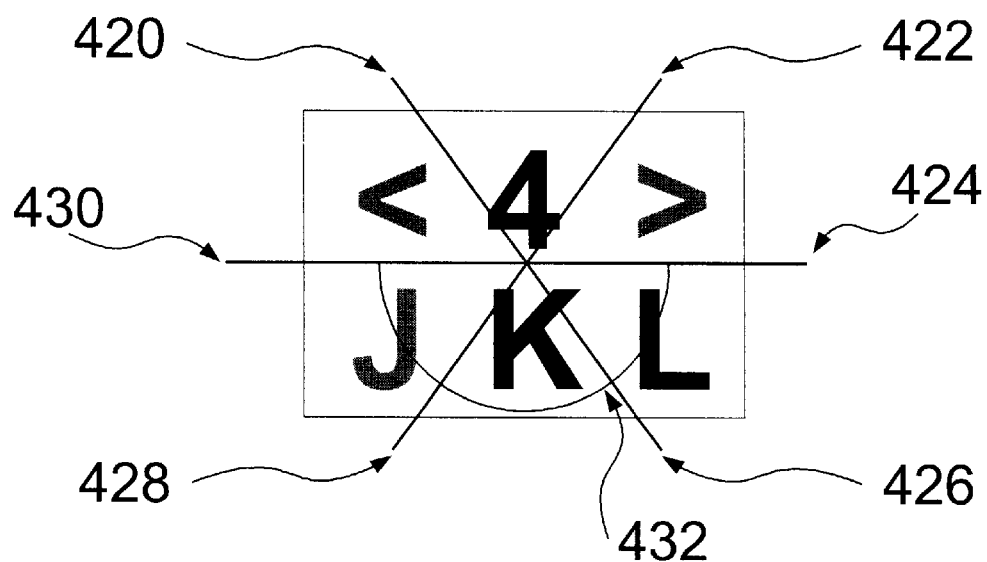

In some cases one can implement a soft multi-function key without displaying multiple labels. Some examples are given in FIG. 11. For example, in FIG. 11a a 2-way soft key is given. The only label is the lower a letter 'a' and two zones for that key is shown. By touching the key and move the finger/stylus upward upper case 'A' is be entered while simple touch or touch and move downward produce the lower case 'a'. In FIG. 11b the same is done when the label on the key is upper case 'A'. In this case simple touch or touch with move upwards will produce the upper case 'A' while movement downwards will produce the lower case 'a'. In FIG. 11c we have the key 110 introduced in the keypad shown in FIG. 4. In FIG. 11c we added to the key 3 more zones by adding the arc 432. In this way by drawing small trace you enter the lower case letter while by drawing trace longer then the arc radius the user can enter upper case letters.

While specific 2-way, 3-way, 4-way, 5-way and 6-way soft key implementations have been demonstrated, it will be clear to one ordinarily skilled in the art that one can modify those multi functional soft keys in several ways. Using the basic principal of having soft key selected by the initial contact point on any location on the key then selecting one of several options based on the trace, one can modify the shape of the key, the labeling logic, the numbers of functions, the definition of the decision zones and the decision logic in several different ways.

Figure 12:
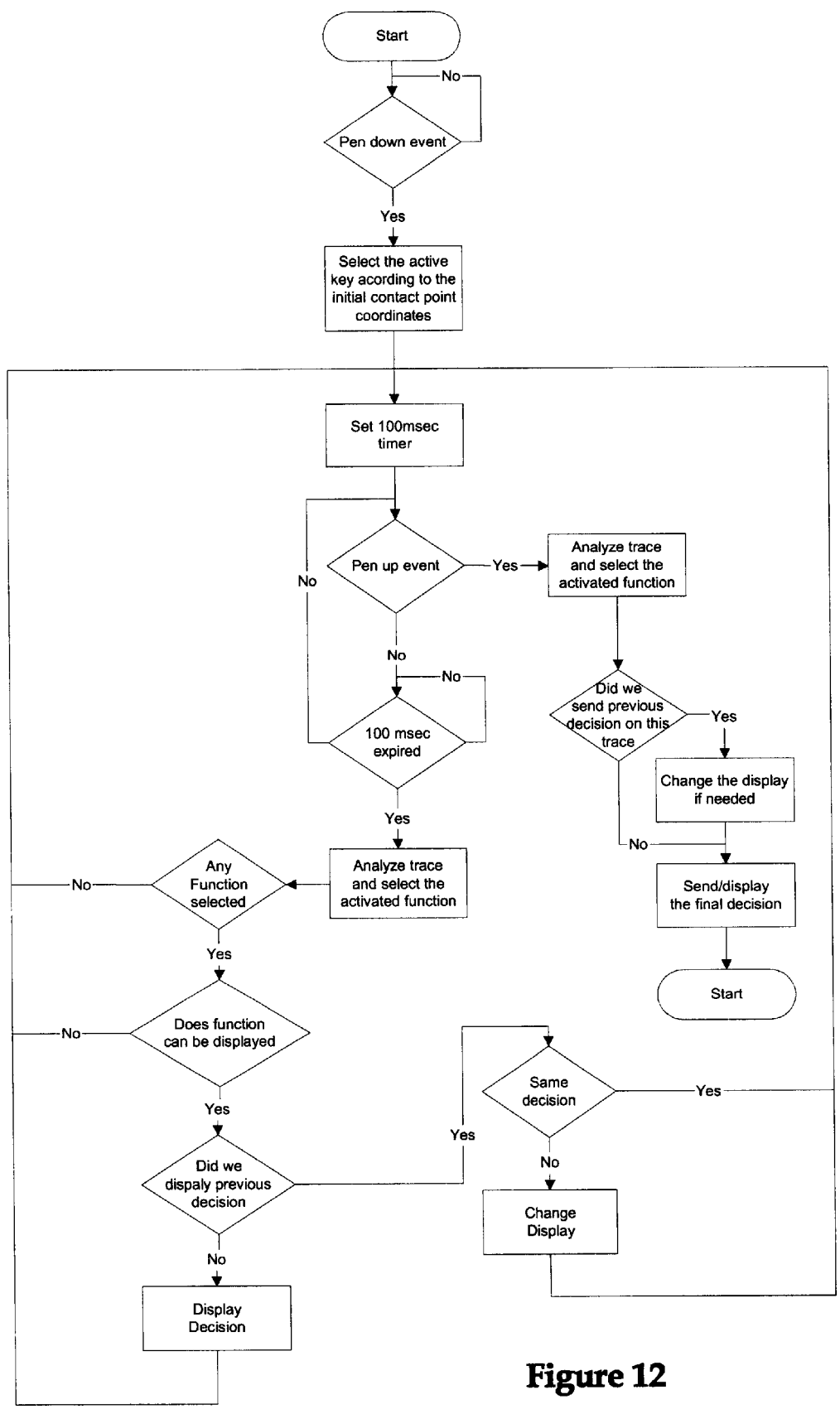
FIG. 12 is a schematic flow diagram illustrating a possible implementation of control logic for the processor of a multifunction keypad constructed and operative according to the teachings of the present invention.

In FIG. 12 a general flow chart of the keypad controller logic is given.

The keypad controller waits for pen down event, i.e., a touch on the screen. When the touch occurred the keypad controller select the active key according to the initial contact point and then set a timer for 100 mil-second. If the function of the key is a displayed symbol on the display the keypad controller will display the current selection every 100 millisecond. The symbol displayed can be changed or even discarded every 100 millisecond. When the user pick up the pen/stylus/finger from the screen the last analysis of the trace is done and this analyze set the final displayed symbol or the activated function.

Figure 13A:
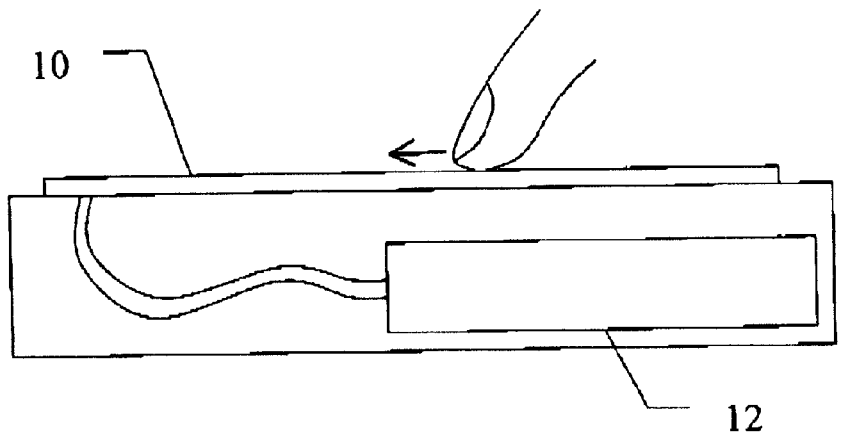
FIGS. 13A and 13B are schematic side cross-sectional views illustrating operation of a multifunction keypad constructed and operative according to the teachings of the present invention.
Figure 13B:
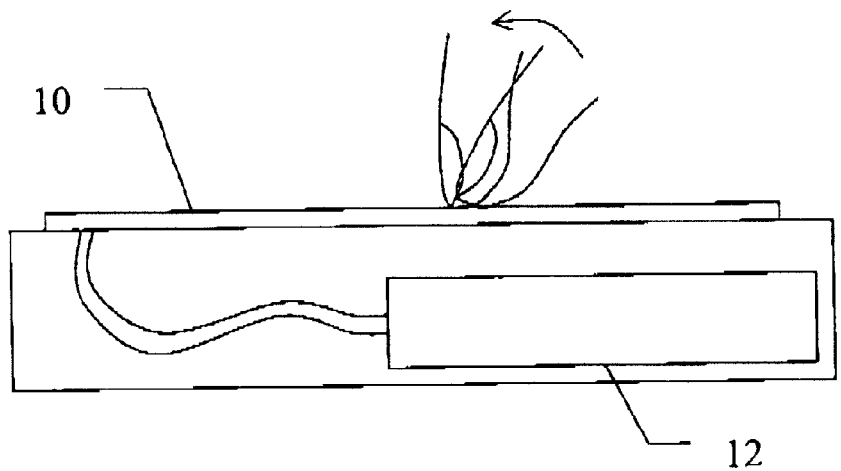

Finally, FIGS. 13A and 13B illustrate operation of the keypad of the present invention for selecting an "upward" function of a given key. The figures illustrate the equivalence of finger movement (FIG. 13A) and a rolling/tilting of the finger (FIG. 13B) to generate the required trace.

It will be appreciated that the above descriptions are intended only to serve as examples, and that many other embodiments are possible within the spirit and the scope of the present invention.

What is claimed is:

1. A multifunction keypad comprising:
   (a) a touch-sensitive surface having defined thereon a plurality of regions designated as keys; and
   (b) a processor associated with said touch-sensitive surface and configured to:
      (i) identify a contact location at which an object comes into contact with said touch-sensitive surface,
      (ii) determine a selected one of said keys corresponding to the one of said regions within which said contact location is located,
      (iii) identify a direction of motion of the object across said touch-sensitive surface relative to said contact location, and
      (iv) select in a manner conditional upon at least said direction of motion one of a plurality of functions associated with said selected key.

2. The keypad of claim 1, wherein said touch-sensitive surface is a touch-sensitive display screen.

3. The keypad of claim 1, wherein said processor is configured to select a first of said plurality of functions if said direction of motion falls within a first range of angles and a second of said plurality of functions if said direction of motion falls within a second range of angles non-overlapping with said first range of angles.

4. The keypad of claim 3, wherein said processor is configured not to select any of said plurality of functions if said direction of motion falls within a third range of angles interposed between said first range and said second range of angles.

5. The keypad of claim 3, wherein said first range of angles is greater than said second range of angles.

6. The keypad of claim 1, wherein said processor is further configured to determine a length of motion of the object across said touch-sensitive surface relative to said contact location.

7. The keypad of claim 6, wherein said processor is configured to select a first of said plurality of functions if said length of motion falls within a first range of lengths in a given direction and a second of said plurality of functions if said length of motion falls within a second range of lengths in said given direction.

8. The keypad of claim 6, wherein said processor identifies a length of motion below a given value as a touch-and-release condition.

9. The keypad of claim 8, wherein said processor is configured not to select any of said plurality of functions on occurrence of a touch-and-release condition.

10. The keypad of claim 8, wherein said processor is configured to select a first of said plurality of functions if said direction of motion falls within a first range of angles, and wherein said processor is configured to select said first function additionally on occurrence of a touch-and-release condition.

11. The keypad of claim 8, wherein one of said plurality of functions is selected by said processor exclusively on occurrence of a touch-and-release condition.

12. The keypad of claim 1, wherein a plurality of said keys provide at least four direct functions per key.

13. The keypad of claim 1, wherein a majority of said keys provide exactly four direct functions per key.

14. The keypad of claim 1, wherein said processor is selectively operable in a single-function mode wherein said processor selects a single function on contact with a given one of said keys independent of said direction of motion.

15. The keypad of claim 1, wherein said plurality of keys includes a twelve-key telephone-type alphanumeric keypad, wherein each key corresponding to a digit in the range 2–9 is associated with three letters, and wherein the letter "s" is associate with a key corresponding to "*" and the letter "z" is associated with a key corresponding to "#".

16. The keypad of claim 15, wherein the letters "s" and "z" are selected by contact with the key corresponding to "*" and "#", respectively, followed by movement in a generally upward direction of motion.

17. The keypad of claim 15, wherein said plurality of keys further includes a row of keys associated with at least the functions ENTER, SPACE and DELETE.

18. A method for designating functions on a multifunction keypad defined by a plurality of regions on a touch-sensitive surface, each region being designated as a key, the method comprising:
   (a) identifying a contact location at which an object comes into contact with the touch-sensitive surface,
   (b) determining a selected key corresponding to the region within which the contact location is located,
   (c) identifying a direction of motion of the object across the touch-sensitive surface relative to the contact location, and
   (d) selecting in a manner conditional upon at least said direction of motion one of a plurality of functions associated with the selected key.

19. The method of claim 18, wherein said touch-sensitive surface is a touch-sensitive display screen.

20. The method of claim 18, wherein a first of said plurality of functions is selected if said direction of motion falls within a first range of angles and a second of said plurality of functions is selected if said direction of motion falls within a second range of angles non-overlapping with said first range of angles.

21. The method of claim 20, wherein none of said plurality of functions is selected if said direction of motion falls within a third range of angles interposed between said first range of angles and said second range of angles.

22. The method of claim 20, wherein said first range of angles is greater than said second range of angles.

23. The method of claim 18, further comprising determining a length of motion of the object across said touch-sensitive surface relative to said contact location.

24. The method of claim 23, wherein a first of said plurality of functions is selected if said length of motion falls within a first range of lengths in a given direction and a second of said plurality of functions is selected if said length of motion falls within a second range of lengths in said given direction.

25. The method of claim 23, wherein a length of motion below a given value is identified as a touch-and-release condition.

26. The method of claim 25, wherein none of said plurality of functions is selected on occurrence of a touch-and-release condition.

27. The method of claim 25, wherein a first of said plurality of functions is selected if said direction of motion falls within a first range of angles, and wherein said first function is additionally selected on occurrence of a touch-and-release condition.

28. The method of claim 25, wherein one of said plurality of functions is selected exclusively on occurrence of a touch-and-release condition.

29. The method of claim 18, wherein at least four direct functions are associated with each of a plurality of said keys.

30. The method of claim 18, wherein exactly four direct functions are associated with each of a majority of said keys.

31. The method of claim 18, further comprising selectively operating said keypad in a single-function mode wherein a single function is selected on contact with a given one of said keys independent of said direction of motion.

* * * * *